Figure 1:
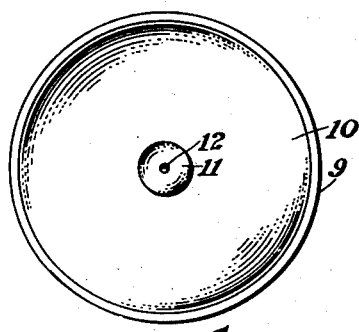

March 1, 1949.  C. G. BIRDSALL  2,463,454
DRY CELL BATTERY
Filed June 2, 1945

PAPER WASHER
METAL CAN
INSULATION
ZINC FOIL
BATTERY PAPER
PAPER JACKET

INVENTOR.
CHARLES G. BIRDSALL.
BY Fay, Golrick & Chilton.
Attorneys.

Patented Mar. 1, 1949

2,463,454

UNITED STATES PATENT OFFICE 2,463,454

DRY CELL BATTERY

Charles G. Birdsall, Rocky River, Ohio, assignor to General Dry Batteries, Inc., Cleveland, Ohio, a corporation of Ohio Application June 2, 1945, Serial No. 597,220

6 Claims. (Cl. 136—133)

This invention relates generally to a dry cell or dry cell battery unit which is particularly adapted for use in flashlights, hearing aids and the like.

One of the objects of the invention is to provide a dry cell which is of such construction as to avoid or to reduce to a minimum the likelihood of an exhausted cell swelling or sticking within the flashlight case or hearing aid device. Another object of the invention is to provide a dry cell which will not leak after discharge or in which the tendency to leak is reduced to a minimum.

One of the problems heretofore encountered has been that an exhausted dry cell, if left within the flashlight casing or hearing aid after it is spent or exhausted, will tend to swell and stick therewithin. Leakage and swelling of the cell is practically always produced because of the excess zinc left after the depolarizing mix has been exhausted. In the conventional cell, the zinc is only partly consumed during the useful life of the cell. The zinc container for the cell has heretofore usually been made several times heavier than is necessary for the normal life of the cell. As a result of this the chemical reactions in the cell continue long after the useful life of the cell has been exhausted and/or until the zinc has been consumed. These chemical reactions produce zinc chloride and other salts which are voluminous and eventually produce enough pressure to force their way out of the cells which may result in damage to the equipment in which they are used.

I propose to construct a dry cell which will have therein only sufficient zinc for the required capacity of the cell so that when the cell is spent or exhausted, the zinc will be practically all consumed. In other words, the amount of zinc used is such that it will be exhausted during the normal life of the cell, and all chemical reactions will practically stop or discontinue when the cell or cells become exhausted, thereby reducing to a minimum the likelihood of leakage and swelling.

Fundamentally, a preferred form of the cell consists of an outer metal cup or container which may be of zinc or aluminum or some other suitable metal of sufficient strength and thickness to withstand the usual machine operations. The outer metal container or cup is lined with an insulating material which is coated with zinc foil or it may have zinc sprayed thereupon to give a layer of the required thickness. The zinc makes electrical contact with the metal container above the insulating material so that the container can be used as one of the terminals of the cell in the usual manner.

Figure 2:
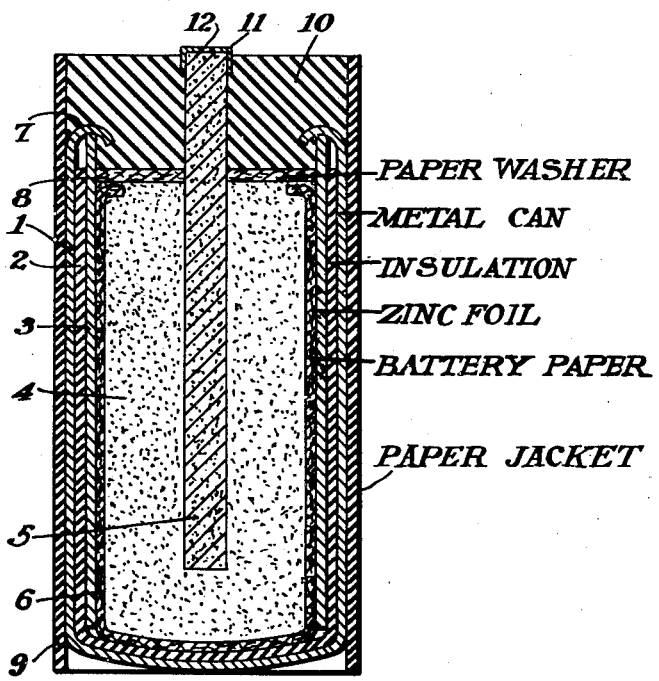

Further and more limited objects of my invention will appear as the description proceeds and by reference to the accompanying drawings in which Fig. 1 is a top plan view and Fig. 2 a vertical sectional view of a dry cell embodying the features of my invention.

Referring now to the drawings, the reference character 1 designates an outer metal cup or container which may be formed of zinc, aluminum or other suitable metallic material. The outer container is lined with a thin layer of insulation such as paper indicated by the reference character 2. Disposed within the lined container is a thin annular layer of zinc foil which is indicated by the reference character 3. The thickness of the zinc foil is preferably of the order of .003 to .007 inch. The container is substantially filled with a mass of depolarizing mix 4 in which is inserted a carbon electrode 5. The mix is separated from the zinc foil by a layer of battery paper indicated by the reference character 6. The battery paper is preferably of a thickness of the order of .003 to .007 inch. The upper end of the outer metal container is turned over inwardly, as indicated at 7 and bears against the upper edge of the annular layer of zinc foil so as to insure good electrical contact therewith. Disposed over the mass of mix is a paper washer 8; and covering the metal can is a paper jacket 9 which extends above the top of the outer metal container. The cell is closed by a layer of hard sealing material 10 which is preferably poured therein while soft. This layer of sealing material is preferably formed of wax or similar material which will adhere to and bond with both the inturned edge of the outer metal container and the paper jacket. The carbon electrode extends through the mass of sealing material and has thereon a brass cap 11 having therein a vent 12 through which excessive pressure may be relieved.

Various changes may be made in the details of construction and arrangement of parts as hereinbefore pointed out without departing from the spirit of my invention. For example, the zinc may be sprayed upon the insulating material to give a layer of the required thickness. If desired, I may use a duplex kraft paper which has been impregnated with asphalt as an insulator. The zinc foil may be attached to the duplex paper and the outer container lined with it. A thin sheet of flexible plastic may be used in place of the paper, or the outer container may be lined with insulating material and a zinc layer sprayed or otherwise applied to it. The construction is also adapted for use with the well-known bag-type cell. In any case, however, the amount of zinc used preferably should be such that it will be substantially all exhausted or consumed during the normal life of the cell.

Various other changes may be made in the details of construction as well as in the materials used without departing from the spirit of my invention. The invention is therefore limited only in accordance with the scope of the appended claims.

Having thus described my invention, what I claim is:

1. A dry cell comprising a metal can lined with a thin layer of insulating material, an annular layer of zinc foil disposed within the lined can and covering substantially the entire side wall area thereof, a mass of depolarizing mix disposed within the metal can and within said layer of zinc foil and separated therefrom by a layer of paste coated battery paper and containing a carbon electrode, the upper edge of said metal can being curled inwardly and engaging said layer of zinc foil, a mass of sealing material closing the upper end of said metal can.

2. A dry cell comprising a metal can lined with a thin layer of insulating material, an annular layer of zinc foil disposed within the lined can and covering substantially the entire inner side wall area thereof, a mass of depolarizing mix disposed within the metal can and within said layer of zinc foil and separated therefrom by a layer of paste coated battery paper and containing a carbon electrode, the upper edge of said metal can being curled inwardly and engaging said layer of zinc foil, a mass of sealing material closing the upper end of said metal can, and an outer paper jacket embracing said metal can and extending thereabove and bonded with said mass of sealing material.

3. A dry cell comprising a metal can, a thin layer of insulating material disposed within the can, a layer of zinc disposed within the insulating material and in engagement with the inner side thereof, a mass of depolarizing mix disposed within said layer of zinc and containing a carbon electrode, means for separating said mix from said layer of zinc, the upper edge of said metal can being curled inwardly into electrical contact with said layer of zinc, and means for closing the upper end of said metal can.

4. A dry cell comprising a metal can, a thin layer of insulating material disposed within the can, a layer of zinc disposed within the insulating material and in engagement with the inner side thereof, a mass of depolarizing mix disposed within said layer of zinc and containing a carbon electrode, means for separating said mix from said layer of zinc, the upper edge of said metal can being curled inwardly into electrical contact with said layer of zinc, and means for closing the upper end of said metal can, the amount of zinc in said layer being such that it will be exhausted in the normal life of said cell.

5. A dry cell according to claim 3 wherein the layer of zinc is composed of zinc foil.

6. A dry cell according to claim 3 wherein the layer of zinc is composed of sprayed zinc.

CHARLES G. BIRDSALL.

REFERENCES CITED

The following references are of record in the file of this patent:

UNITED STATES PATENTS

| Number | Name | Date |
| --- | --- | --- |
| 917,272 | Enochs | Apr. 6, 1909 |
| 1,602,915 | Little et al. | Oct. 12, 1926 |
| 1,654,038 | Deibel | Dec. 27, 1927 |
| 2,272,907 | Deibel | Feb. 10, 1942 |
| 2,307,627 | Lawson | Jan. 5, 1943 |
| 2,332,456 | McEachron | Oct. 19, 1943 |

FOREIGN PATENTS

| Number | Country | Date |
| --- | --- | --- |
| 129,423 | Great Britain | July 8, 1919 |